(12) United States Patent
Yates et al.

(10) Patent No.: US 11,106,997 B2
(45) Date of Patent: Aug. 31, 2021

(54) CONTENT DELIVERY BASED ON CORRECTIVE MODELING TECHNIQUES

(71) Applicant: Facebook, Inc., Menlo Park, CA (US)

(72) Inventors: Andrew Donald Yates, San Francisco, CA (US); Gunjit Singh, San Francisco, CA (US); Kurt Dodge Runke, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 965 days.

(21) Appl. No.: 15/721,203

(22) Filed: Sep. 29, 2017

(65) Prior Publication Data

US 2019/0102694 A1 Apr. 4, 2019

(51) Int. Cl.
| | | |
|---|---|---|
| *G06N 5/04* | (2006.01) | |
| *G06N 20/00* | (2019.01) | |
| *G06N 3/08* | (2006.01) | |
| *G06N 3/04* | (2006.01) | |
| *H04L 29/08* | (2006.01) | |

(52) U.S. Cl.
CPC ............ *G06N 20/00* (2019.01); *G06N 3/0454* (2013.01); *G06N 3/084* (2013.01); *G06N 5/04* (2013.01); *H04L 67/10* (2013.01)

(58) Field of Classification Search
CPC ........ G06N 20/00; G06N 20/10; G06N 20/20; G06N 5/04; H04L 67/10
USPC .......................................................... 706/11
See application file for complete search history.

(56) References Cited

U.S. PATENT DOCUMENTS

| | | | | |
|---|---|---|---|---|
| 9,330,357 | B1* | 5/2016 | Ferdowski | G06Q 10/0635 |
| 10,290,040 | B1* | 5/2019 | Misra | H04L 67/22 |
| 10,497,012 | B1* | 12/2019 | Majumder | G06Q 30/0641 |
| 2005/0096758 | A1* | 5/2005 | Takezawa | G05B 13/048 |
| | | | | 700/44 |
| 2010/0082120 | A1* | 4/2010 | Stephenson | D21G 9/0009 |
| | | | | 700/29 |
| 2015/0074020 | A1* | 3/2015 | Arpat | G06N 5/04 |
| | | | | 706/12 |
| 2017/0004408 | A1* | 1/2017 | Edelen | G06Q 30/02 |
| 2017/0097982 | A1* | 4/2017 | Zhang | G06F 16/285 |
| 2018/0046940 | A1* | 2/2018 | Hummel | G06N 20/00 |
| 2018/0137203 | A1* | 5/2018 | Hennekey | G06F 16/9535 |
| 2018/0225370 | A1* | 8/2018 | Cora | G06K 9/6254 |
| 2019/0114509 | A1* | 4/2019 | Deng | G06N 3/084 |

* cited by examiner

*Primary Examiner* — Miranda M Huang
*Assistant Examiner* — Leon W Cheung
(74) *Attorney, Agent, or Firm* — Fenwick & West LLP

(57) ABSTRACT

An online system uses multiple machine learning models to select content for providing to a user of the online system. Specifically, the online system trains a general model that intakes a first set of features and outputs predictions at a general level. The online system further trains a residual model that intakes a second set of features. The residual model predicts a residual (e.g., an error) of the predictions outputted by the general model. Therefore, the predicted residual from the residual model is combined with the prediction from the general model in order to correct for the over-generality of the general model. The online system may use the combined prediction to send content to users.

24 Claims, 6 Drawing Sheets

| Training Example | First Set of Features 205 | Output Label 315 | Predicted Output 215 | Residual 325 |
|---|---|---|---|---|
| Training Example 350A | $[A_{11}, A_{12}...B_{11}, B_{12}...]$ | 1 | 0.1 | 0.9 |
| Training Example 350B | $[A_{21}, A_{22}...B_{21}, B_{22}...]$ | 0 | 0.05 | -0.05 |
| Training Example 350C | $[A_{31}, A_{32}...B_{31}, B_{32}...]$ | 1 | 0.2 | 0.8 |
| Training Example 350D | $[A_{41}, A_{42}...B_{41}, B_{42}...]$ | 0 | 0.15 | -0.15 |

FIG. 3B

CONTENT DELIVERY BASED ON CORRECTIVE MODELING TECHNIQUES

CROSS-REFERENCE TO RELATED APPLICATIONS

This application is related to U.S. patent application Ser. No. 15/206,211 filed on Jul. 8, 2016, which is hereby incorporated by reference in its entirety.

TECHNICAL FIELD

This disclosure generally relates to machine learning based models used for predictions in online systems, and in particular to corrective modeling by using multiple machine learning models to generate accurate prediction.

BACKGROUND

Online systems, such as social networking systems, provide content to users of the online system. The online system may receive content from users or from third party system. Users of the online system may be individuals or entities such as organizations, corporations or charities. Online systems often use machine learning models in order to determine whether a user of the online system would be interested in a particular content item. For example, an online system can train a general machine learning model that is related to a topic associated with the particular content item. However, a machine learning model may not be able to output accurate predictions regarding specific contexts. Online systems may train specific machine learning models for different contexts. Conventional techniques for training models of different levels of specificity are significantly resource intensive (e.g., time consuming, excessive computing memory and processing power, and the like). For example, online systems often train a general model using training examples and then re-train models of higher specificity using the same training examples, but with the addition of new features. Therefore, the development and training of each model of higher specificity is more expensive than a model of higher generality.

SUMMARY

An online system trains a general machine learning model that outputs predictions at a general level. The online system further trains a second machine learning model, hereafter referred to as a residual model, that predicts an error (e.g., residual) of the predictions of the general machine learning model. The online system uses the predicted residual from the residual model to correct predictions of the general learning model in order to obtain a new prediction with a higher specificity. For example, the online system may predict whether a user would be interested in a content item by applying the general model and the residual model, and then correcting the prediction of the general model using the predicted residual of the residual model.

In an embodiment, the online system generates feature vectors that includes features extracted from the content item as well as features extracted from user information associated with the user of the online system. The online system uses the general model to generate a prediction based on these features. In various embodiments, the online system evaluates the importance of each feature when training the general model. For example, a subset of features may heavily influence the prediction outputted by the general model. As such, the online system does not include the subset of features when generating a feature vector for training and applying the residual model. Doing so ensures that the residual model can capture the influence of features that are not captured by the general model. In various embodiments, the online system includes features that are specific for a third party system in the feature vector for training and applying the residual model. Therefore, each residual model can be generated for a particular third party system and as such, a corrected prediction generated by combining the prediction from the general model and the predicted residual from the residual model can be a prediction that is uniquely tailored for the third party system. In various embodiments, the online system determines whether to send the content item to the user according to the corrected prediction.

Referring now to the training of the general and residual models, generally, the general model is trained using training examples from general training data. For each training iteration, a residual is calculated by determining the difference between the prediction of the general model and the output label of the training example. The residual for that training iteration is used to train the residual model. For example, the residual can serve as the output label for the residual model. As another example, at a training iteration, the magnitude of the residual influences the extent in which the parameters of the residual model are tuned in that iteration. Accordingly, the residual model is trained to minimize an error between the predicted residual and the actual residual obtained from the general model.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3B depicts an example diagram of generated residuals from a general model, in accordance with an embodiment.

Figure 1:
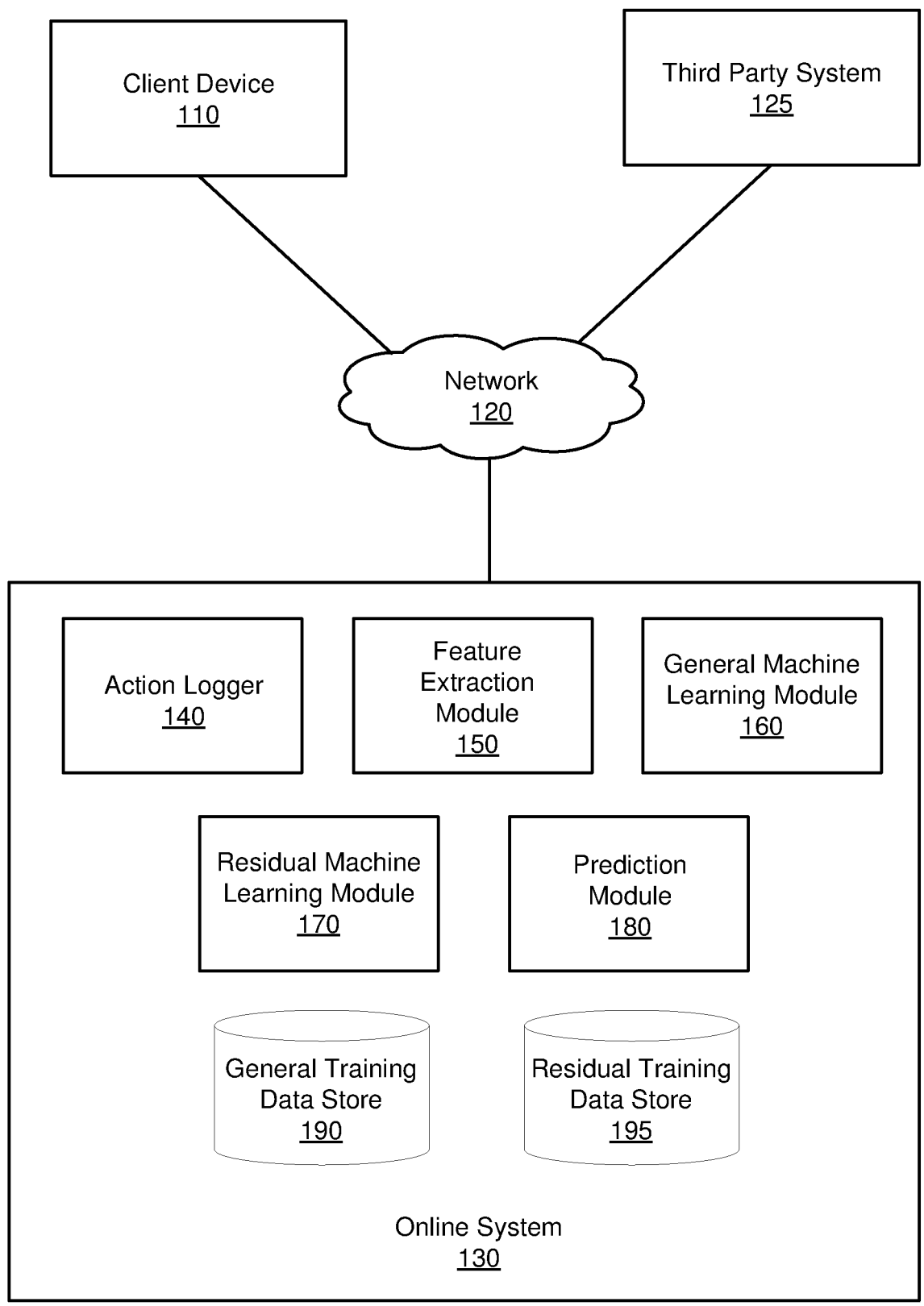
FIG. 1 depicts an overall system environment for personalizing content delivery through corrective modeling techniques, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "350A," indicates that the text refers specifically to the element having that particular reference numeral. A reference numeral in the text without a following letter, such as "350," refers to any or all of the elements in the figures bearing that reference numeral (e.g. "training example 350" in the text refers to reference numerals "training example 350A" and/or "training example 350B" in the figures).

DETAILED DESCRIPTION

Overall System Environment

FIG. 1 depicts an overall system environment 100 for personalizing content delivery through corrective modeling techniques, in accordance with an embodiment. The system environment 100 can include one or more client devices 110, a third party system 125, and an online system 130 interconnected through a network 120. In other embodiments, the online system 130 may include additional, fewer, or different components for various applications. Conventional components such as network interfaces, security functions, load balancers, failover servers, management and network operations consoles, and the like are not shown so as to not obscure the details of the system architecture.

Client Device

The client device 110 is an electronic device associated with an individual. Client devices 110 can be used by individuals to perform functions such as consuming digital content, executing software applications, browsing websites hosted by web servers on the network 120, downloading files, and interacting with content provided by the online system 130. Examples of a client device 110 includes a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc. The client device 110 may execute instructions (e.g., computer code) stored on a computer-readable storage medium. A client device 110 may include one or more executable applications, such as a web browser, to interact with services and/or content provided by the online system 130. In another scenario, the executable application may be a particular application designed by the online system 130 and locally installed on the client device 110. Although one client device 110 is illustrated in FIG. 1, in other embodiments the environment 100 may include more than one client device 110. For example, the online system 130 may communicate with millions of client devices 110 through the network 120 and can provide content to each client device 110 to be viewed by the individual associated with the client device 110.

Network

The network 120 facilitates communications between the client device 110, third party system 125, and online system 130. The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol FTP, or any other suitable communication protocol.

Third Party System

A third party system 125, such as a content provider system, provides content to an online system 130 through the network 120. In various embodiments, a third party system 125 may be an advertiser and therefore, the third party system 125 provides sponsored content (e.g., advertisements) as well as targeting criteria for the sponsored content. Targeting criteria specify one or more characteristics of users eligible to be presented with the sponsored content. For example, targeting criteria are used to identify users having user profile information, edges, or actions satisfying at least one of the targeting criteria. Hence, targeting criteria allow a content provider to identify users having specific characteristics, simplifying subsequent distribution of content to different users.

In various embodiments the third party system 125 can provide additional information that is helpful for personalizing sponsored content for users. For example, the third party system 125 may have its own set of features that it provides to the online system 130 for personalizing content. These features of a third party system 125 are hereafter referred to as custom features.

In another embodiment, the set of custom features is unique for each user of the online system 130. Thus, each user may have stored in a corresponding user profile multiple sets of custom features, each set associated with a third party system 125. In various embodiments where the system environment 100 includes more than one third party systems 125, each user may have a profile with a set of custom features for the user for a first third party system, a set of custom features for a second third party system, a set of custom features for a third party system, and so forth. For example, a set of custom features for a third party system 125 that is a travel information provider may include a custom feature indicating each destination search on that travel information provider by the user. As an example, when a user makes such a search, a tracking pixel may fire, thereby causing a message to be sent to the online system 130 including the data for this custom feature. A tracking pixel may be a segment of HTML, code that the online system 130 provides to third party systems 125 for implementation on websites of the third party systems 125. A tracking pixel may be a transparent 1×1 image, an iframe, or other suitable object. As another example, a custom feature for a third party system 125 that is an educational provider may identify the last course that was taken by the user. As another example, a custom feature for a third party system 125 that is a retailer may be a pre-determined discount for a user. The pre-determined discount may be tailored for a particular user (e.g., a specific user may be more likely to purchase an item that has an above threshold discount).

In another embodiment, a set of custom features is unique for a set of users of the online system 130 characterized by a particular set of user profile attribute values. Accordingly, a first set of custom features is associated with a first set of users, a second set of custom features is associated with a second set of users, and so on. For example, each set of users may correspond to a set of demographic characteristics.

In various embodiments, custom features provided by a third party system 125 are features of the third party system 125. As an example, custom features may include attributes about a content item provided by the third party system 125, attributes of general users that are of interest to the third party system 125, previous rate of interaction between general users and various types of content items. As a further example, a specific custom feature provided by the third party system 125 may refer to a specific discount (e.g., 20% discount, 30% discount) that is specific for an item of the third party system 125. This discount is unique for the third party system 125 and therefore, serves as a custom feature.

Custom features may represent any type of data in any format, such as an alphanumeric string, Boolean, enumeration, number, table, binary object, timestamp, and so on. Each third party system's specific features can be used in personalizing content delivery to the user.

Online System

In the embodiment shown in FIG. 1, the online system 130 includes an action logger 140, a feature extraction module 150, a general machine learning module 160, a residual machine learning module 170, and a prediction module 180. The online system 130 may further include a general training data store 190 and a residual training data store 195 that respectively store general training data and residual training data which can be retrieved to train the general model and residual model, respectively.

The online system 130 trains and applies machine learning models to predict and provide content to various individuals that may be interested in the provided content. In various embodiments, the online system 130 applies a general machine learning model to predict whether a user would be interested in a content item. In various embodiments, the general machine learning model predicts the occurrence of an event such as an interaction with a personalized content item (e.g., a click on the content item, a conversion on a content item, and the like). Generally, the general machine learning model is trained on general training data that are related to a topic and derive from wide-ranging scenarios. For example, a general machine learning model may be trained on general training data that is related to "travel" and as such, the general learning model can make predictions for any travel-related content. Therefore, the general machine learning model can be applied to various travel-related content received from third party systems 125 to generate a general prediction.

To obtain a prediction that considers features of a higher specificity, the online system 130 further applies a residual model. For example, if a general machine learning model is applicable to a particular type of travel-related content, then a residual model can be applicable to a sub-topic of travel-related content e.g., flight-related content. In various embodiments, each specific sub-topic may be associated with a third party system 125. Accordingly, a residual model can be specific for content provided by a particular third party system 125. In another embodiment, the residual model can be specific for a particular set of users, for example, a set of users having a particular set of demographic attribute values. The residual model predicts a residual value that represents the difference between a general prediction generated by the general model and the actual occurrence or non-occurrence of a sub-topic related event. Returning to the example above, features of a flight-related content item can be applied to a general model specific for travel-related content. The online system 130 can also apply features of the flight-related content item to a residual model that is specific for flight-related content to generate a predicted residual.

The online system 130 uses the prediction from the residual model to supplement the general prediction. Therefore, instead of individually training highly specific machine learning models using specific sets of training data, which would be a highly expensive process, the online system 130 can train residual models that predict residuals that can be used to correct the predictions from a general model. As an example, the prediction from the residual model can be used to adjust the general prediction to correct for the over-generality of the general prediction. Therefore, the online system 130 can provide more personalized content to users of the online system 130.

In various embodiments, the online system 130 may be a social networking system that enables users of the online system 130 to communicate and interact with one another. In this embodiment, the online system 130 can use information in user profiles, connections between users, and any other suitable information to maintain a social graph of nodes interconnected by edges. Each node in the social graph represents an object associated with the online system 130 that may act on and/or be acted upon by another object associated with the online system 130. An edge between two nodes in the social graph represents a particular kind of connection between the two nodes. An edge may indicate that a particular user of the online system 130 has shown interest in a particular subject matter associated with a node. For example, the user profile may be associated with edges that define a user's activity that includes, but is not limited to, visits to various fan pages, searches for fan pages, liking fan pages, becoming a fan of fan pages, sharing fan pages, liking advertisements, commenting on advertisements, sharing advertisements, joining groups, attending events, checking-in to locations, and buying a product. These are just a few examples of the information that may be stored by and/or associated with a user profile.

In various embodiments, the online system 130 selects and provides content to users of the social networking system based on user information stored in the user's profile and/or in the social graph. As an example, the online system 130 can apply one or more machine learning models (e.g., a general machine learning model and a residual machine learning model) for predicting whether a user would be interested in a particular content item. The online system 130 combines the predictions from the general model and residual model to determine whether a user would interact with the content item.

Referring specifically to the individual elements of the online system 130, the action logger 140 receives communications about user actions internal to and/or external to the online system 130. In various embodiments, the action logger 140 stores the detected user actions in an action log. Examples of actions include adding a connection to another user, sending a message to another user, uploading an image, reading a message from another user, viewing content associated with another user, attending an event posted by another user, among others. In addition, a number of actions may involve an object and one or more particular users of the online system 130, so these actions are associated with those users as well.

The action log that includes the detected user actions may be used by the online system 130 to track user actions on the online system 130, as well as actions on third party systems 125 that communicate information to the online system 130. User interactions between the user and objects in the online system 130 can include: commenting on posts, sharing links, and checking-in to physical locations via a mobile device, accessing content items, commenting on a photo album, communicating with a user, establishing a connection with an object, joining an event to a calendar, joining a group, creating an event, authorizing an application, using an application, expressing a preference for an object ("liking"

the object), engaging in a transaction, or a click on a personalized content provided by the online system 130. In some embodiments, user interactions captured by the action logger 140 can be used to infer interests or preferences of a user, augmenting the interests included in the user's user profile and allowing a more complete understanding of user preferences.

The action logger 140 may also store user actions taken on a third party system 125, such as an external website, and communicated to the online system 130. For example, an e-commerce website (e.g., third party system 125) that primarily sells sporting equipment at bargain prices may recognize a user of an online system 130 through a social plug-in enabling the e-commerce website to identify the user of the online system 130. Because users of the online system 130 are uniquely identifiable, e-commerce websites, such as this sporting equipment retailer, may communicate information about a user's actions outside of the online system 130 to the online system 130 for association with the user. Hence, the action logger 140 may record information about actions users perform on a third party system 125, including webpage viewing histories, advertisements that were engaged, purchases made, and other patterns from shopping and buying.

The feature extraction module 150 generally extracts features and generates feature vectors that are provided as input to machine learning models (e.g., general model and residual model). In one embodiment, the feature extraction module 150 extracts features from a content item provided by a third party system 125. For example, features extracted from a content item can include one or more of: subject matter of the content item, color(s) of an image, duration of a video, identity of the third party system 125 that provided the content item, and the like. Therefore, the feature extraction module 150 may apply various algorithms, such as pattern/image recognition algorithms, to extract features from a content item. In some embodiments, the feature extraction module 150 extracts features of the user of the online system 130. For example, various features can be extracted from the social graph of the online system 130 and/or user profile associated with the user of the online system 130. Features of the user include: personal information of the user (e.g., name, physical address, email address, age, and gender), user interests, past activity performed by the user, and the like. In some embodiments, the feature extraction module 150 extracts features, such as custom features, from the data provided by the third party system 125. Such features may be user-associated (e.g., activities performed by the user on the third party system 125) or specific for the third-party system 125 (e.g., a specified discount percentage). In some embodiments, the third party system 125 directly provides custom features for use by the feature extraction module 150.

The feature extraction module 150 constructs one or more feature vectors to be provided as input into a model. In various embodiments, the feature extraction module 150 performs a feature selection process in determining which features are to be included in each feature vector. For example, the features included in each feature vector may be based on the model that the feature vector is to be provided as input to.

In various embodiments, the feature extraction module 150 selects features and generates a feature vector to be provided as input to a general model that includes at least 1) one or more features extracted from data describing the content item and 2) one or more features extracted from data describing the user. Thus, the general model that receives the feature vector can consider features from both the content item and the user of the online system 130 to predict whether the user would interact with the content item.

In various embodiments, the feature extraction module 150 selects features and generates a feature vector to be provided as input to a residual model that includes at least 1) one or more features extracted from data describing the content item, 2) one or more features extracted from data describing the user, and 3) one or more features extracted from data provided by the third party system 125. In some embodiments, a subset of features included in the feature vector that is provided as input to the general model is also included as features in the feature vector that is provided as input to the residual model. For example, if the general model is a neural network, the final layer of neurons in the neural network can be included as features for the residual model.

In various embodiments, when selecting features to be included in the feature vector to be provided as input to a residual model, the feature extraction module 150 performs an evaluation process based on training examples relevant for the residual model and the residuals from the general model. As an example, collaborative filtering can be applied to the relevant training examples to predict the residual of the general model that corresponds to these relevant training examples. Other examples of feature selection methods include top N by ranking by model weights, by loss metric increase through feature permutation or hold-out testing, and/or quantitative regularization methods including feature vector norm penalties and heuristics that incrementally penalize the inclusion of not-yet included features. The feature extraction module 150 selects the features for the residual model that can most accurately predict the corresponding residual obtained from the general model.

Altogether, the feature extraction module 150 selects features for the residual model such that the residual model can capture the effects of features that were not captured by the general model as opposed to training a second model that would be redundant to the general model (albeit, at a higher specificity). For example, if a general model captures a relationship between a feature and a training label, then the feature extraction module 150 does not include the same feature for the residual model. Alternatively, if a general model does not capture a relationship between a feature and a training label, then the same feature can be included for the residual model.

The general machine learning module 160 trains and applies a general model. Generally, the general model receives a feature vector including various features and outputs a prediction, such as a likelihood that a user presented with a content item would interact with the content item. The general model can be trained on general training data obtained from the general training data store 190. As described above, the general training data can derive from wide-ranging scenarios that are related to a topic. As a specific example, the general machine learning model can be trained on general training data that corresponds to any content that is related to the general topic of "travel." Therefore, the general model can be applied to various travel-related content received from third party systems 125 to generate a general prediction. The general machine learning module 160 calculates a residual by determining a difference between a predicted output generated by the general model and an output label of the general training data store. In other words, the residual represents an error in the predicted output of the general model. The calculated residual can be provided to the residual machine learning module 170. The general machine learning module 160 is described in further detail below in FIG. 2 and FIG. 3A.

The residual machine learning module 170 trains and applies a residual model. Generally, each residual model receives, as input, a feature vector generated by the feature extraction module 150, and outputs a predicted residual which represents a predicted error of a prediction of the general model.

The residual model can be trained on residual training data obtained from the residual training data store 195. In various embodiments, the calculated residual provided by the residual generator module 310 serves as residual training data (e.g., ground truth data) and is compared to the predicted residual generated by the residual model. Therefore, the residual machine learning module 170 can train the residual model to minimize a residual error (e.g., difference between the residual and the predicted residual). Each residual model is trained on residual training data, for example, data that corresponds to a specific sub-topic or data that corresponds to a set of users. As described above, if the general model is trained on general training data that corresponds to a general topic such as "travel," then a residual model can be trained on residual training data that corresponds to a sub-topic such as a specific travel medium (e.g., by car, by public transportation, by train, by airplane, and the like). Therefore, for a single general model that is specific for a topic, there may be multiple residual models trained by the residual machine learning module 170, each residual model corresponding to a sub-topic of the topic. Similarly, a general model may be applicable to a particular type of third party systems, for example, third party systems that provide content related to a particular type of activity, for example, recreational activity. Each residual model may be applicable to a particular sub-type of third party systems such that each sub-type is of the particular type. In the above example, a first residual model may be applicable to third party systems that provide content related to sports activity, a second residual model may be applicable to third party systems that provide content related to travel, and so on. The residual machine learning module 170 is described in further detail below in FIG. 2 and FIG. 4.

The prediction module 180 generates a corrected prediction that accounts for the predicted output from the general model as well as the predicted residual of the residual model. In various embodiments, the corrected prediction represents a more accurate prediction (in comparison to solely the predicted output from the general model) as to whether a user of the online system 130 will interact with a content item presented to the user. In some embodiments, the prediction module 180 sends the content item, now referred to as a personalized content item, to the user of the online system 130 if the corrected prediction is above a threshold score. For example, if the corrected prediction indicates that the likelihood of the user interacting with the personalized content item is above a threshold, the prediction module 180 sends the content item to the user for viewing/consumption.

Application of a General Model and a Residual Model

Figure 2:
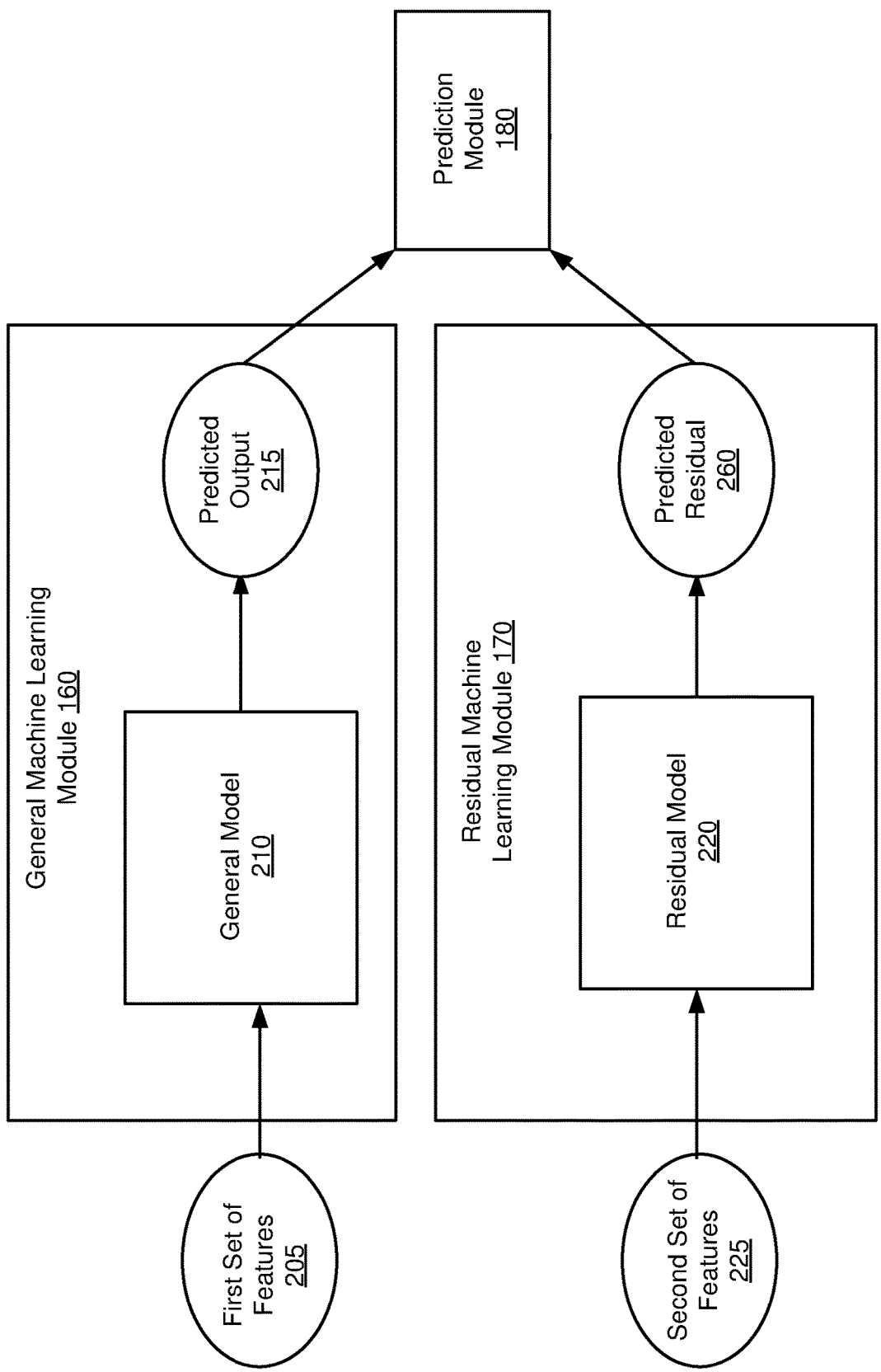
FIG. 2 depicts a block diagram flow process using a residual model to correct for a prediction of a general model, in accordance with an embodiment.

FIG. 2 depicts a block diagram flow process using a residual model to correct for a prediction of a general model, in accordance with an embodiment. Generally, the block diagram flow process depicted in FIG. 2 is executed by a production system (e.g., after the general model 210 and residual model 220 have been previously trained). In various embodiments, the general machine learning module 160 and the residual machine learning module 170 can apply the general model 210 and the residual model 220 in parallel to obtain their respective outputs, thereby achieving their respective predictions in reduced processing time in comparison to processing them sequentially.

Generally, the general machine learning module 160 applies the general model 210 to a first set of features 205 in order to obtain a predicted output 215. The first set of features 205 may be embodied as a feature vector generated by the feature extraction module 150. In some embodiments, the feature vector provided as input to the general model 210 includes features extracted from a content item and features extracted from data describing the user of the online system 130. Therefore, the general model 210 predicts a likelihood of a user of the online system 130 interacting with the content item based on the first set of features 205.

The residual machine learning module 170 applies the residual model 220 to a second set of features 225 to obtain a predicted residual 260. The second set of features 205 may also be embodied as a feature vector generated by the feature extraction module 150. In one embodiment, the second set of features 205 includes custom features that are provided by a third party system 125. In some embodiments, the second set of features 225 also includes features extracted from the content item and features extracted from the user of the online system 130. In various embodiments, the second set of features 225 includes a subset of the first set of features 205, thereby ensuring that the residual model 220 is able to capture the effects of certain features that may not have been sufficiently captured or were otherwise overshadowed due to more influential features in the first set of features 205. In various embodiments, the second set of features includes all or a combination of any of the features described herein (e.g., features extracted from a content item, features extracted from a user, custom features, subset of the first set of features 205).

The predicted output 215 and the predicted residual 260 are provided to the prediction module 180. Generally, the prediction module 180 corrects for the over-generality of the predicted output 215 using the predicted residual 260 and can then send a personalized content item to a user of the online system 130 based on the combination of the predicted output 215 and predicted residual 260. In one embodiment, the prediction module 180 combines the predicted output 215 and the predicted residual 260 to generate a corrected prediction, for example, by summing the two values or by taking a weighted aggregate of the two values.

Although FIG. 2 only depicts a general model (first model) and a residual model (second model), one skilled in the art may appreciate that more than two models can be employed. For example a third model can be employed that is trained to receive a third set of features. The trained third model can predict an error of the predicted residual 260. Therefore, the predicted output 215, the predicted residual 260, and the error of the predicted residual (from the third model) can be provided to the prediction module 180 to generate the corrected prediction.

In some embodiments, the general machine learning module 160 and the residual machine learning module 170 each performs a check prior to applying the general model 210 and the residual model 220, respectively. Such checks can be performed asynchronously relative to one another. By performing the checks, the online system 130 can decide whether it would be appropriate to apply both the general model 210 and the residual model 220 to obtain the corrected prediction. For example, through these checks, the online system 130 determines whether the increased accuracy of a corrected prediction in comparison to the predicted output 215 is worth the addition consumption of computer resources that are needed to execute the residual model 220.

Specifically, the online system 130 determines a prediction loss for the general model 210, a prediction loss for the corrected prediction, and an evaluation cost for applying the residual model 220. The online system 130 considers these losses/costs to determine whether the corrected prediction is a significant improvement over the predicted output 215 that would warrant the extra computational cost. If the extra computational cost is warranted, then the general machine learning module 160 and residual machine learning module 170 applies their respective models and the prediction module 180 generates the corrected prediction. If the extra computational cost is not warranted, the predicted output 215 can be used without being further corrected.

Training a General Model

Figure 3A:
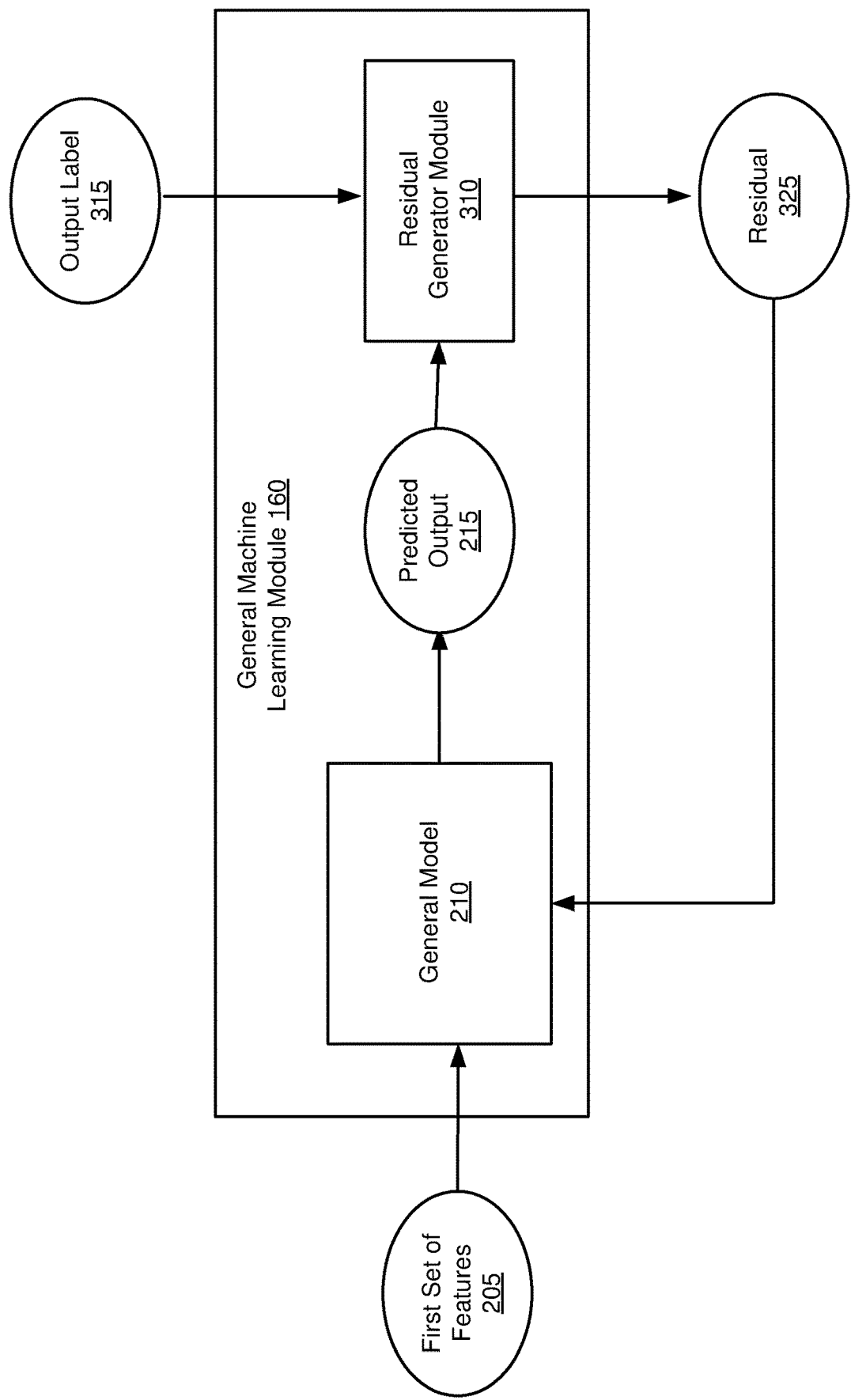
FIG. 3A depicts a block diagram flow process for generating a residual while training a general model, in accordance with an embodiment.

FIG. 3A depicts a block diagram flow process for generating a residual 325 while training a general model 210, in accordance with an embodiment. Further reference will be made to FIG. 3B, which depicts an example table of generated residuals from a general model 210, in accordance with an embodiment.

Generally, the general model 210 is trained using training examples from the general training data. More specifically, FIG. 3A depicts a single iteration of the training process where the general machine learning module 160 receives a first set of features 250 that were extracted from a training example in the general training data. A training example may correspond to a content item and a user of the online system 130 that was presented with the content item. Additionally, the general machine learning module 160 receives an output label 315 that corresponds to the same training example in the general training data. An output label 315 represents the actual occurrence of the prediction (e.g., an interaction performed by the user on the content item).

As an example, FIG. 3B depicts information corresponding to each iteration of training the general model 210. More specifically, each row of FIG. 3B represents a training example 350 (e.g., training example 350A, training example 350B, training example 350C, and training example 350D) that is used for a training iteration. In other words, each row (e.g., training example 350) represents one application of the general model 210 to a first set of features 205 that was previously derived from the training example 350.

An example feature vector of the first set of features 205 extracted from training example 350A may be represented as $[A_{11}, A_{12}, \ldots B_{11}, B_{12} \ldots]$. Specifically, $A_{nm}$ can be the mth extracted feature from a content item for the nth prediction. $B_{nm}$ can be the mth extracted feature from a user of the online system 130 for the nth prediction. In other embodiments, additional features not derived from the content item or the user of the online system 130 can be further included in the first set of features 205.

As shown in FIG. 3A, application of the first set of features 205 to the general model 210 yields a predicted output 215. As an example, the general model 210 may be trained to predict the likelihood that a user of the online system 130 will interact with a content item presented to the user. Therefore, in various embodiments, the general model 210 generates a predicted output 215 between 0 and 1. FIG. 3B depicts varying predicted output 215 values of 0.1, 0.05, 0.2, and 0.15 for the different training examples 350.

FIG. 3A depicts that the predicted output 215 and the output label 315 are provided to a residual generator module 310 which calculates a value of a residual 325. In various embodiments, the residual 325 is the difference between the output label 315 and the predicted output 215. Examples of residual 325 values corresponding to different training examples 350 are shown in FIG. 3B.

As shown in FIG. 3A, the residual 325 can be provided back (e.g., backpropagated) to the general machine learning module 160 to iteratively train the general model 210. For example, the general model 210 is trained using additional training examples from the general training data store 190 to minimize the residual 325 value over the subsequent iterations.

In various embodiments, the calculated value of the residual 325 represents the performance of the general model 210. Specifically, the magnitude of residuals 325 corresponding to training example 350B and training example 350B are significantly smaller than the magnitude of residuals 325 corresponding to training example 350A and training example 350C. Therefore, a residual 325 with a small magnitude (e.g., high performance), when backpropagated to the general machine learning module 160, may cause the general model parameters to be minimally tuned whereas a residual 325 with a larger magnitude (e.g., poor performance), when backpropagated, may cause the general model parameters to be more heavily tuned.

In various embodiments, parameters of the general model 210 that are tuned include weights that are assigned to each feature of the first set of features 205. Therefore, certain features in the first set of features 205 may be assigned higher weights than other features, which reflects the higher impact and importance of those certain features on the predicted output 215. In various embodiments, the weights assigned to each feature of the first set of features 205 can be provided back to the feature extraction module 150 such that the feature extraction module 150 can extract and select the appropriate features to be provided to the residual model, as described above.

In various embodiments, the calculated residuals 325 are stored in the residual training data store 195. In some scenarios, the residuals 325 undergo a transformation prior to the being stored. For example, the residuals 325 may be transformed and stored as a log loss metric. As another example, the absolute values of the residuals 325 are stored. The residuals 325 stored in the residual training data store 195 can be subsequently retrieved by the residual machine learning module 170 for training a residual model 220, as described further below.

Training a Residual Model

Figure 4:
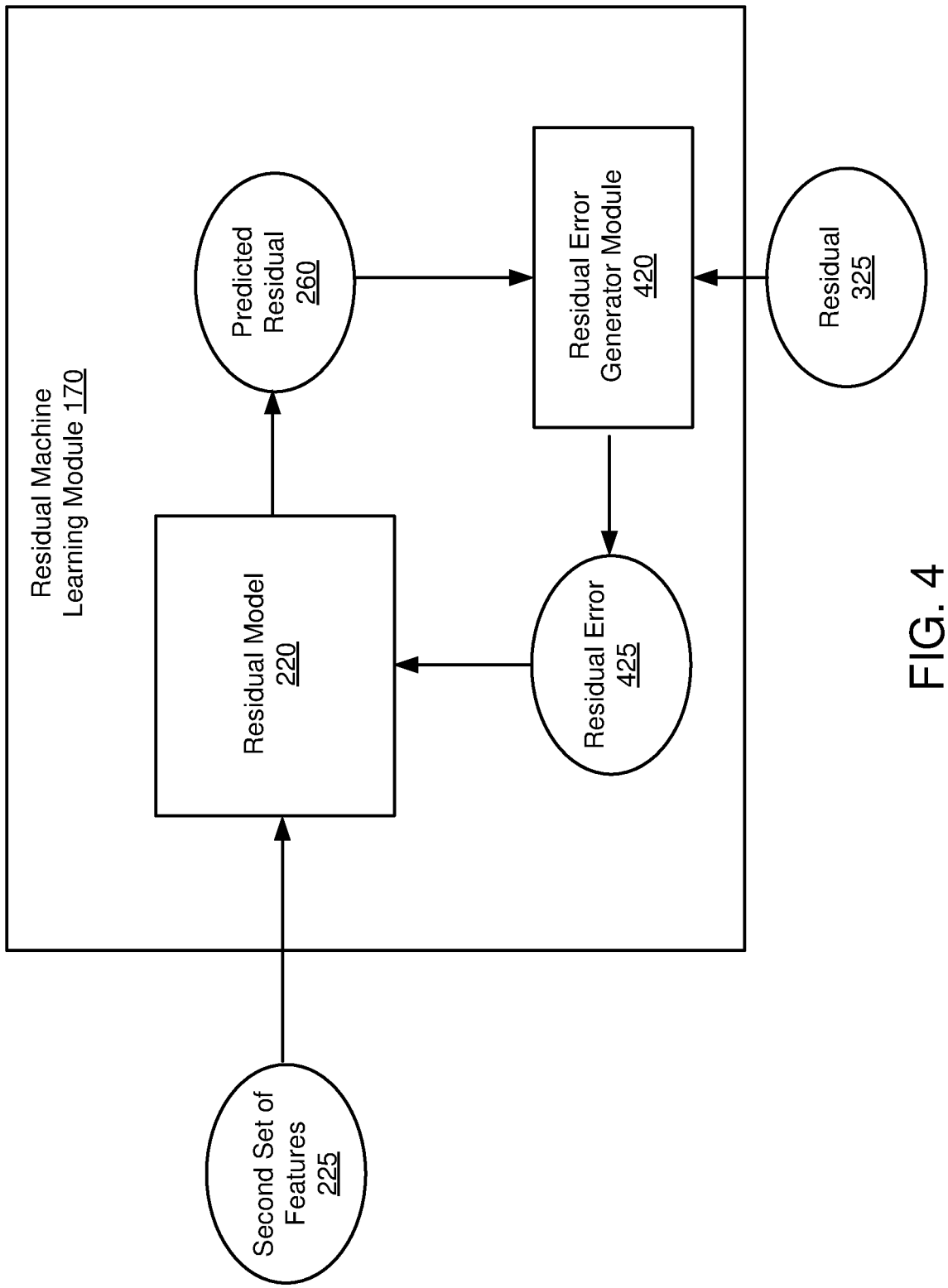
FIG. 4 depicts a block diagram flow process of training a residual model, in accordance with an embodiment.

FIG. 4 depicts a block diagram flow process of training a residual model 220, in accordance with an embodiment. Generally, the residual machine learning module 170 receives residual training data from the residual training data store 195 and trains the residual model on the residual training data. The residual training data includes the residual values 325. In one embodiment, the residual values 325 serve as the output label for training the residual model 220. In some embodiments, the residual value 325 is used to assign a weight to a training example. For example, training examples in the residual training data that correspond to residuals 325 with a larger magnitude would be more heavily weighted in comparison to training examples that correspond to residuals 325 with a lower magnitude. Therefore, during a training iteration, a more heavily weighted training example would more heavily impact the tuning of the parameters of the residual model in comparison to a less weighted training example. In various embodiments, the residual values 325 serve as both the output label and for determining a weight of importance in training a residual model 220.

As shown in FIG. 4, the residual machine learning module 170 further receives a second set of features 225 (e.g., a feature vector) generated by the feature extraction module 150. In various embodiments, the second set of features 225 includes a subset of features that were included in the first set of features 205 that was denoted above as [$A_{nm} \ldots B_{nm}$], where $A_{nm}$ represents features extracted from a content item and $B_{nm}$ represents features extracted from a user of the online system 130. In some embodiments, the second set of features 225 received by the residual machine learning module 170 further includes custom features provided by a third party system 125.

At each iteration of the training process, the residual machine learning module 170 applies a second set of features 225 corresponding to a training example as input to the residual model 220. The residual model 220 outputs a predicted residual 260. The predicted residual 260 and the residual 325, which serves as the output label, are provided to the residual error generator module 420 that then calculates a residual error 425. In one embodiment, the residual error generator module 420 determines the residual error 425 as the difference between the predicted residual 260 and the residual 325. As shown in FIG. 4, the residual error 425 can be backpropagated such that the residual model 220 is iteratively trained using additional residual training examples to minimize the residual error 425.

Figure 5:
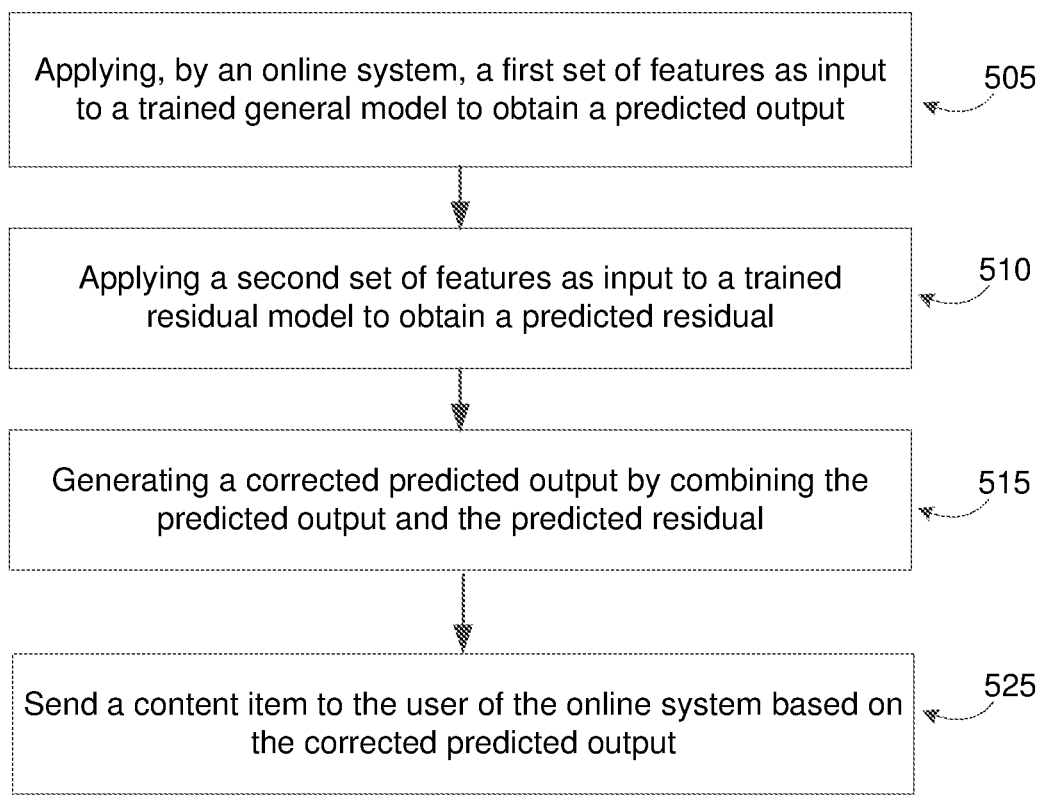
FIG. 5 depicts an example flow process of providing personalized content using corrective modeling techniques, in accordance with an embodiment.

Process of Personalizing Content Delivery Through Corrective Modeling Techniques FIG. 5 depicts an example flow process of providing personalized content using corrective modeling techniques, in accordance with an embodiment. Specifically, an online system 130 can receive multiple content items that are to be presented to users of the online system. To determine which content items to present to which users, the online system 130 extracts a first set of features from data from users, such as user profile attributes, and data from content items, such as content item attributes. The online system applies 505 the first set of features 205 as input to a trained general model 210. The trained general model 210 outputs a predicted output. In some scenarios, the predicted output represents a likelihood that the user of the online system 130 will interact with the personalized content item.

The online system 130 extracts a second set of features from data from users and data from content items. The online system 130 applies 510 the second set of features 225 as input to a trained residual model 220. The trained residual model 220 outputs a predicted residual 260 that represents the difference between the output of a general model and a theoretical output of a theoretical model of higher specificity. The online system 130 generates 515 a corrected predicted output by combining the predicted output from the general model 210 and the predicted residual 260 from the residual model 220. Specifically, the predicted residual 260 corrects for the over-generality of the predicted output from the general model 210.

The online system 130 selects a content item from the multiple content items that were previously received. The online system sends 525 the content item to the user of the online system 130 based on the corrected predicted output. In various embodiments, the content item is provided to the user of the online system 130 if the corrected predicted output is above a threshold value.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, a plurality of content items associated with a topic for delivery to a viewing user of the online system;
for each of the plurality of content items:
extracting a first set of features, each feature in the first set based on one or more of user profile attributes of the viewing user or content item attributes of the content item, wherein one or more features in the first set of features are specific to the topic;
applying the first set of features as input to a general model corresponding to the topic to generate a predicted output, wherein the predicted output represents a likelihood of the viewing user interacting with the content item;

extracting a second set of features, each feature in the second set based on one or more of user profile attributes of the viewing user or content item attributes of the content item, wherein one or more features in the second set of features are specific to a sub-topic of the topic and not included in the first set of features;

applying the second set of features as input to a residual model corresponding to the sub-topic of the topic to generate a predicted residual value, wherein the predicted residual value is configured to adjust the predicted output of the general model based on the one or more features in the second set of features that are specific to the sub-topic; and generating a corrected predicted output by combining the predicted output and the predicted residual value;

selecting a content item from the plurality of content items for delivery to a user of the online system based on the corrected predicted outputs of the plurality of content items; and sending the selected content item to the user of the online system.

2. The method of claim 1, wherein the residual model is iteratively trained on residual training examples, each residual training example comprising a residual that represents a difference between a predicted output from the general model and an output label from general training data.

3. The method of claim 2, wherein the residual of the residual training example serves as an output label for iteratively training the residual model.

4. The method of claim 2, wherein at each training iteration of the residual model, parameters of the residual model are tuned, and wherein an extent of tuning of the parameters of the residual model is based on a magnitude of the residual of the residual training example.

5. The method of claim 1, wherein at least a subset of the second set of features are selected by evaluating features based on training examples relevant for the residual model.

6. The method of claim 1, wherein the sub-topic of the residual model refers to a third party system, and wherein the second set of features comprises one or more custom features that are provided by the third party system.

7. The method of claim 6, wherein a custom feature is provided by the third party system in response to a tracking pixel being fired by an action performed by the viewing user.

8. The method of claim 6, wherein the custom features include a rate of interaction of users of the online system with a content item of the third party system, wherein the users were previously presented with the content item.

9. The method of claim 1, wherein the predicted output and the corrected predicted output are each a prediction of an occurrence of an event, wherein the event is one of a click or conversion.

10. The method of claim 1, wherein generating a corrected predicted output comprises combining the predicted output and the predicted residual value.

11. The method of claim 1, wherein the sub-topic of the residual model refers to a plurality of third party systems, and wherein the second set of features comprises a plurality of sets of custom features, each set of custom features received from a third party system from the plurality of third party systems.

12. A non-transitory computer-readable medium comprising computer program code, that, when executed by a processor, causes the processor to:

receive, by an online system, a plurality of content items associated with a topic for delivery to a viewing user of the online system;

for each of the plurality of content items:

extract a first set of features, each feature in the first set based on one or more of user profile attributes of the viewing user or content item attributes of the content item, wherein one or more features in the first set of features are specific to the topic;

apply the first set of features as input to a general model corresponding to the topic to generate a predicted output, wherein the predicted output represents a likelihood of the viewing user interacting with the content item;

extract a second set of features, each feature in the second set based on one or more of user profile attributes of the viewing user or content item attributes of the content item, wherein one or more features in the second set of features are specific to a sub-topic of the topic and not included in the first set of features;

apply the second set of features as input to a residual model corresponding to the sub-topic of the topic to generate a predicted residual value, wherein the predicted residual value is configured to adjust the predicted output of the general model based on the one or more features in the second set of features that are specific to the sub-topic; and generate a corrected predicted output by combining the predicted output and the predicted residual value;

select a content item from the plurality of content items for delivery to a user of the online system based on the corrected predicted outputs of the plurality of content items; and send the selected content item to the user of the online system.

13. The non-transitory computer-readable medium of claim 12, wherein the residual model is iteratively trained on residual training examples, each residual training example comprising a residual that represents a difference between a predicted output from the general model and an output label from general training data.

14. The non-transitory computer-readable medium of claim 13, wherein the residual of the residual training example serves as an output label for iteratively training the residual model.

15. The non-transitory computer-readable medium of claim 13, wherein at each training iteration of the residual model, parameters of the residual model are tuned, and wherein an extent of tuning of the parameters of the residual model is based on a magnitude of the residual of the residual training example.

16. The non-transitory computer-readable medium of claim 12, wherein at least a subset of the second set of features are selected by executing computer program code that causes the processor to evaluate features based on training examples relevant for the residual model.

17. The non-transitory computer-readable medium of claim 12, wherein the sub-topic of the residual model refers to a third party system, and wherein the second set of features comprises one or more custom features that are provided by the third party system.

18. The non-transitory computer-readable medium of claim 12, wherein the predicted output and the corrected predicted output are each a prediction of an occurrence of an event, wherein the event is one of a click or conversion.

19. The non-transitory computer-readable medium of claim 12, wherein the computer program code that causes the processor to generate a corrected predicted output further comprises computer code that, when executed by the processor, causes the processor to combine the predicted output and the predicted residual value.

20. A method comprising:
   receiving general training data comprising training examples associated with a topic, each training example corresponding a content item and a user and comprising an output label that indicates whether an event has occurred;
   for each training example corresponding to a content item and a user:
      applying a first set of features of the training example as input to a general model corresponding to the topic to generate a predicted output that predicts whether the event has occurred, wherein one or more features in the first set of features are specific to the topic;
      determining a residual value by comparing the predicted output to the output label associated with the training example;
      applying a second set of features of the training example as input to a residual model corresponding to a sub-topic of the topic to generate a predicted residual value, wherein one or more features in the second set of features are specific to the sub-topic of the topic and not included in the first set of features; and
      determining a residual error by comparing the predicted residual value associated with the training example to the determined residual value associated with the training example, the residual error backpropagated to minimize the residual error.

21. The method of claim 20, wherein the second set of features comprises custom features that are provided by a third party system.

22. The method of claim 20, wherein at least a subset of the second set of features are selected by evaluating features based on training examples relevant for the residual model.

23. The method of claim 20, wherein evaluating impact of features from the first set of features comprises:
   determining a weight assigned to each feature from the first set of features by the general model;
   identifying a set of features from the first set of features that have below a threshold weight; and
   including the identified set of features in the second set of features.

24. The method of claim 20, wherein training the residual model comprises tuning parameters of the residual model based on a magnitude of the determined residual.

* * * * *